United States Patent
Tran et al.

[11] Patent Number: 5,525,783
[45] Date of Patent: Jun. 11, 1996

[54] MICROWAVE HEATING DEVICE FOR LIME AND CALCINING

[75] Inventors: Hoc N. Tran, Toronto; Javad Mostaghimi, Brampton, both of Canada

[73] Assignee: Tran Industrial Research Inc., Toronto, Canada

[21] Appl. No.: 314,953

[22] Filed: Sep. 29, 1994

Related U.S. Application Data

[62] Division of Ser. No. 57,814, May 7, 1993, Pat. No. 5,378,319.

[51] Int. Cl.$^6$ ............................... H05B 6/78; D21C 11/04
[52] U.S. Cl. ........................ 219/700; 219/686; 219/701; 162/192
[58] Field of Search .................... 219/700, 701, 219/678, 679, 686; 162/192

[56] References Cited

U.S. PATENT DOCUMENTS

| | | | |
|---|---|---|---|
| 2,603,741 | 7/1952 | Seifried et al. | 219/701 |
| 3,277,580 | 10/1966 | Tooby | 219/701 |
| 3,699,899 | 10/1972 | Schiffmann et al. | 219/701 |
| 3,704,523 | 12/1972 | Guerga et al. | 219/701 |
| 4,640,020 | 2/1987 | Wear et al. | 219/701 |
| 4,808,782 | 2/1989 | Nakagawa et al. | 219/701 |

*Primary Examiner*—Philip H. Leung
*Attorney, Agent, or Firm*—Sim & McBurney

[57] ABSTRACT

A two-zone lime mud calciner is provided for processing lime mud from kraft pulp recovery operations. A conveyer is employed for conveying lime mud horizontally through the calciner. The first zone and second zone of the calciner each contains a dielectric hysteresis heating device for first drying the lime mud in the first zone and then decomposing the dried lime mud to lime and carbon dioxide. A co-current flow of purge air removes steam generated in the first zone and a counter-current flow of purge air removes carbon dioxide generated in the second zone with a vent being provided adjacent the upstream and of the second zone.

6 Claims, 3 Drawing Sheets

MICROWAVE HEATING DEVICE FOR LIME AND CALCINING

This is a division of application Ser. No. 057,814 filed May 7, 1993 U.S. Pat. No. 5,378,319.

FIELD OF INVENTION

The present invention relates to a novel procedure for producing lime in kraft pulp mill recovery operations.

BACKGROUND TO THE INVENTION

In the kraft pulping process, wood chips or other cellulosic fibrous material are contacted with a pulping liquor comprising sodium hydroxide and sodium sulfide (white liquor). The resulting wood pulp is separated from spent pulping liquor (black liquor) and further processed. The spent pulping liquor is processed through a chemical recovery and regeneration cycle to form fresh pulping liquor.

Such a chemical recovery and regeneration cycle includes burning concentrated black liquor under reducing conditions in a recovery furnace, dissolving the inorganic combustion residue (smelt), mostly in the form of sodium sulfide and sodium carbonate, in water to form green liquor, and causticizing the green liquor with slaked lime ($Ca(OH)_2$), in a recausticizing plant to produce NaOH, in accordance with the equation:

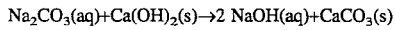

$$Na_2CO_3(aq) + Ca(OH)_2(s) \rightarrow 2\ NaOH(aq) + CaCO_3(s)$$

The precipitated calcium carbonate from the causticization reaction is separated from the regenerated white liquor and washed. The resulting lime mud is calcined to form lime, which is slaked with weakwash (water) to produce $Ca(OH)_2$ for reuse. In a typical kraft pulp mill operation, approximately 0.26 tons of lime are required per ton of unbleached pulp produced.

Calcination of lime mud usually is carried out in an inclined rotary kiln, although flash calciners may be used. A lime kiln typically is dimensioned with an outside diameter of 3 m and a length of 80 m and has a production capacity of 180 tons of CaO per day. Lime mud, with approximately 20 to 35% moisture content, is conveyed from the mud washers and fed to the kiln at the upper end thereof. As the mud moves through the kiln by gravity, it is dried and heated countercurrently by the combustion gases from an oil or gas burner at the lower end of the kiln. Calcination, which theoretically requires 428 kcal of heat per kg of $CaCO_3$, begins at a location where the mud temperature reaches about 800° C., in accordance with the equation:

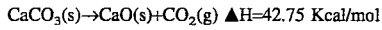

$$CaCO_3(s) \rightarrow CaO(s) + CO_2(g) \quad \Delta H = 42.75\ Kcal/mol$$

Lime mud calcining is a heat-transfer controlled process, i.e. the mud will decompose immediately if sufficient heat is supplied to raise its temperature above the calcination temperature, which varies from about 600° to 870° C., depending on the $CO_2$ partial pressure of the surrounding gas. The higher the temperature, the more rapidly the heat is transferred to the material and the faster is the mud calcined. However, if the temperature is excessively high, in excess of 1200° C., the resulting lime becomes "dead-burned" and less reactive. Maintaining the temperature between 900° and 1100° C. is critical in such prior art procedure for ensuring a high quality product.

SUMMARY OF THE INVENTION

The present invention provides a novel procedure for the production of lime from lime mud, which does not involve the employment of calcination by countercurrent flow of combustion gases. In place of such prior art process, the present invention effects lime mud drying and decomposition using dielectric hysteresis heating (DHH).

In accordance with the present invention, a high frequency field, which may be of microwave or radio-frequency, is employed to generate heat within the body of the lime mud to effect initial drying of the lime mud and subsequent decomposition of dried calcium carbonate. As is well known, when a dielectric material is placed in an electric field, it becomes polarized and as the electric field alternates, successive rotations of dipoles in the material occur, causing the electric energy to dissipate as internal friction. This results in the generation of heat, which increases the material temperature from within.

DHH is particularly effective for dipole molecules since they are attracted in the opposite direction and tend to rotate in the electric field. The rate of heating is directly proportional to the frequency of the electric field, the square of the electric field intensity, and the relative permittivity and loss tangent of the material. The frequency of the field can be either in the radio frequency range, i.e. from about 1 to about 300 MHz, or in the microwave range, i.e. from about 300 to about 30,000 MHz. The relative permittivity and loss tangent vary greatly with material, and also may vary with the frequency of the electric field and the moisture content of the material.

The present invention utilizes these principles to effect drying and decomposition of lime mud to form lime for use in the pulp mill recausticization process, and, in particular, in a specific novel design of pulp mill lime mud calciner, which provides an effective alternative to conventional combustion procedures, which achieves a substantial energy saving and possesses other advantages over the art.

Accordingly, in one aspect of the present invention, there is provided a method of processing lime mud from a kraft pulp mill recovery operation, which comprises effecting a first dielectric hysteresis heating of the lime mud at a radiation intensity level sufficient to effect drying of the lime mud to form essentially moisture-free dried lime mud but insufficient to initiate decomposition of calcium carbonate in the lime mud, and effecting a second dielectric hysteresis heating of the dried lime mud at a radiation intensity level sufficient to effect decomposition of calcium carbonate in the dried lime mud to form lime and carbon dioxide.

In another aspect of the invention, there is provided a lime mud calciner for use in a kraft pulp mill recovery operation, comprising an elongate chamber, conveying means extending generally horizontally through the chamber from an inlet end to an outlet end, a first group of dielectric hysteresis heating elements located in a first upstream zone of the chamber to impart radiation to material conveyed on the conveying means through the first upstream zone, and a second group of dielectric hysteresis heating element located in a second downstream zone of the chamber to impart radiation to material conveyed on the conveying means through the second downstream zone.

DESCRIPTION OF PREFERRED EMBODIMENT

Figure 1:
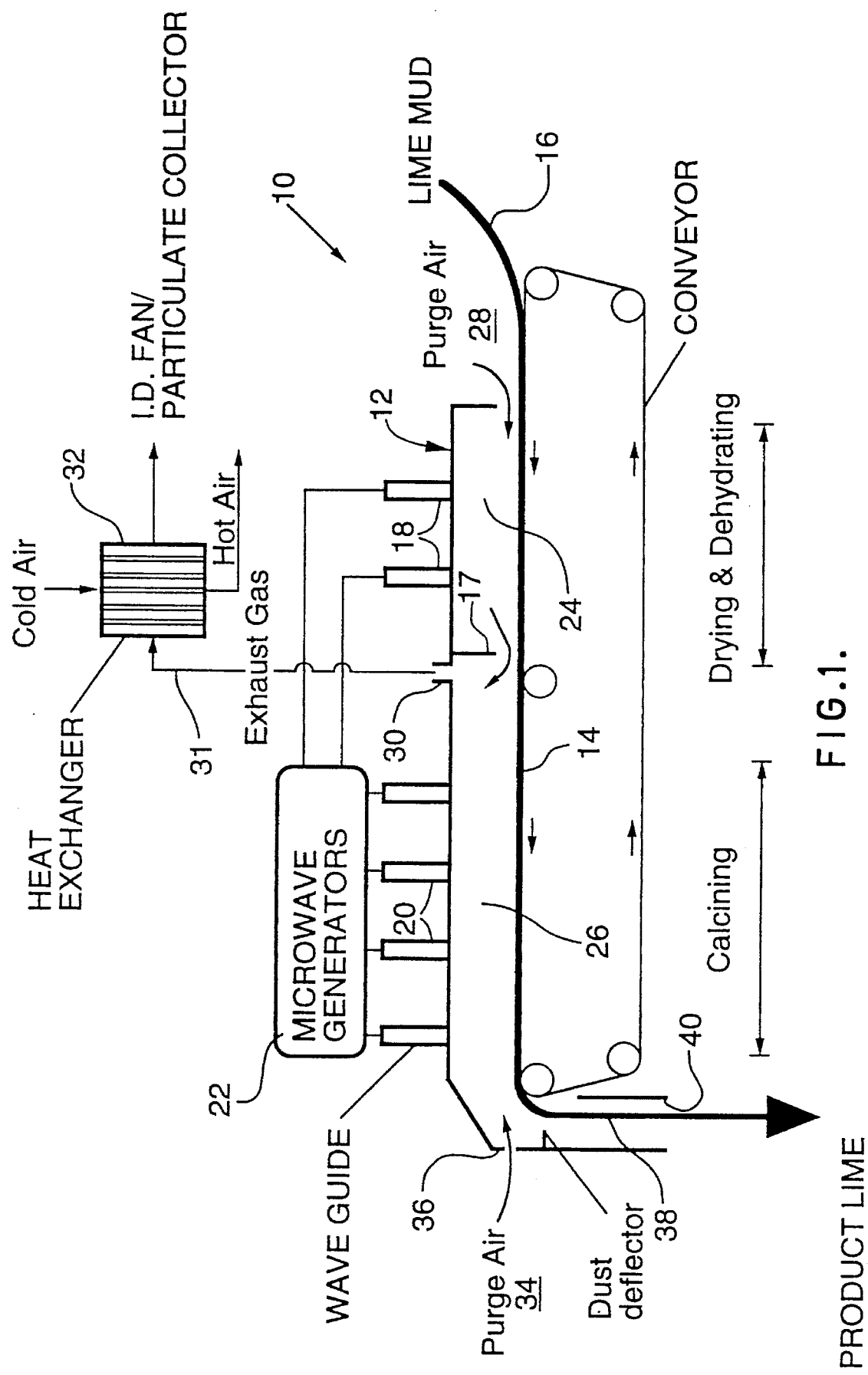
FIG. 1 contains a schematic representation of a microwave lime mud calciner constructed in accordance with one embodiment of the invention.

Referring to the accompanying drawings, FIG. 1 illustrates a calciner 10 comprising an elongate, horizontal chamber 12 through which passes an endless horizontal conveyor 14 for conveying a feed 16 of lime mud from a kraft pulp mill recovery operation through the chamber 12. The chamber 12 is divided by a depending baffle 17 into two separate heating zones or compartments. A series of waveguides 18, 20 is provided within the chamber 12, each in communication with microwave generators 22 which produce a microwave field for each of the waveguides 18, 20. With the illustrated arrangement of waveguides 18, 20, the conveyor 14 is made of a microwave-reflecting material. The inner walls of the chamber 12 also may be provided in the form of or may be coated with microwave-reflective material. One series 18 of waveguides is located in an upstream compartment 24 and the other series 20 of waveguides is located in a downstream compartment 26.

Lime mud 16, with some moisture content, is fed onto the conveyor 14 and transported thereon through the chamber 12. In the upstream compartment 24, the microwave energy is applied from waveguides 20 to provide sufficient microwave energy to increase the temperature of the lime mud to a maximum temperature of about 500° C., so that the calcium carbonate does not decompose in the upstream compartment 24, but rather the lime mud is completely dried and any residual $Ca(OH)_2$ is decomposed. A purge of air 28 is introduced at the upstream end of the upstream compartment 24 to purge generated steam from the upstream compartment 24 at the downstream end into the downstream compartment 26.

An outlet 30 is provided at the upstream end of the downstream compartment 26 connected through a heat exchange 32 to an induction fan or other suitable evacuating device for inducing purge air flow for removal of water vapour and other gases, including carbon dioxide, from the chamber 12 in exhaust gas stream 31. Heated air from the heat exchanger 32 may be used as purge air in the calciner 10, to enhance the heating process. The steam may be removed separately from the other gas, if desired.

The dried calcium carbonate enters the downstream compartment 26 and is exposed therein to a high microwave energy power provided by the second series of microwave guides 30, which rapidly raises the temperature of the dried calcium carbonate above about 800° C., causing calcination to occur. Carbon dioxide generated in the decomposition is purged by an air flow 34 countercurrent to the direction of movement of decomposing calcium carbonate on the conveyor 14 from an inlet 36 at the downstream end of the downstream compartment 26.

Decomposition of calcium carbonate is complete or substantially so at the downstream end of the conveyor 14, providing a stream 38 of lime which is discharged from the apparatus 10 through an outlet 40, for recycle to the recausticizing operation of the pulp mill in conventional manner. A dust deflector 42 may be provided adjacent the downstream end of the conveyor 14 to catch dust from the lime stream 38.

In the embodiment of FIG. 1 the microwave waveguides 18, 20 are illustrated as being located above the conveyor 14, which is constructed of microwave-reflective material. Other arrangements of the waveguides 18, 20 relative to the conveyor 14 and the lime mud conveyed therealong may be employed. For example, as seen in FIG. 2, the waveguides may be provided below the conveyor 14, with the conveyer 14 in this instance being constructed of microwave-transparent material.

Figure 2:
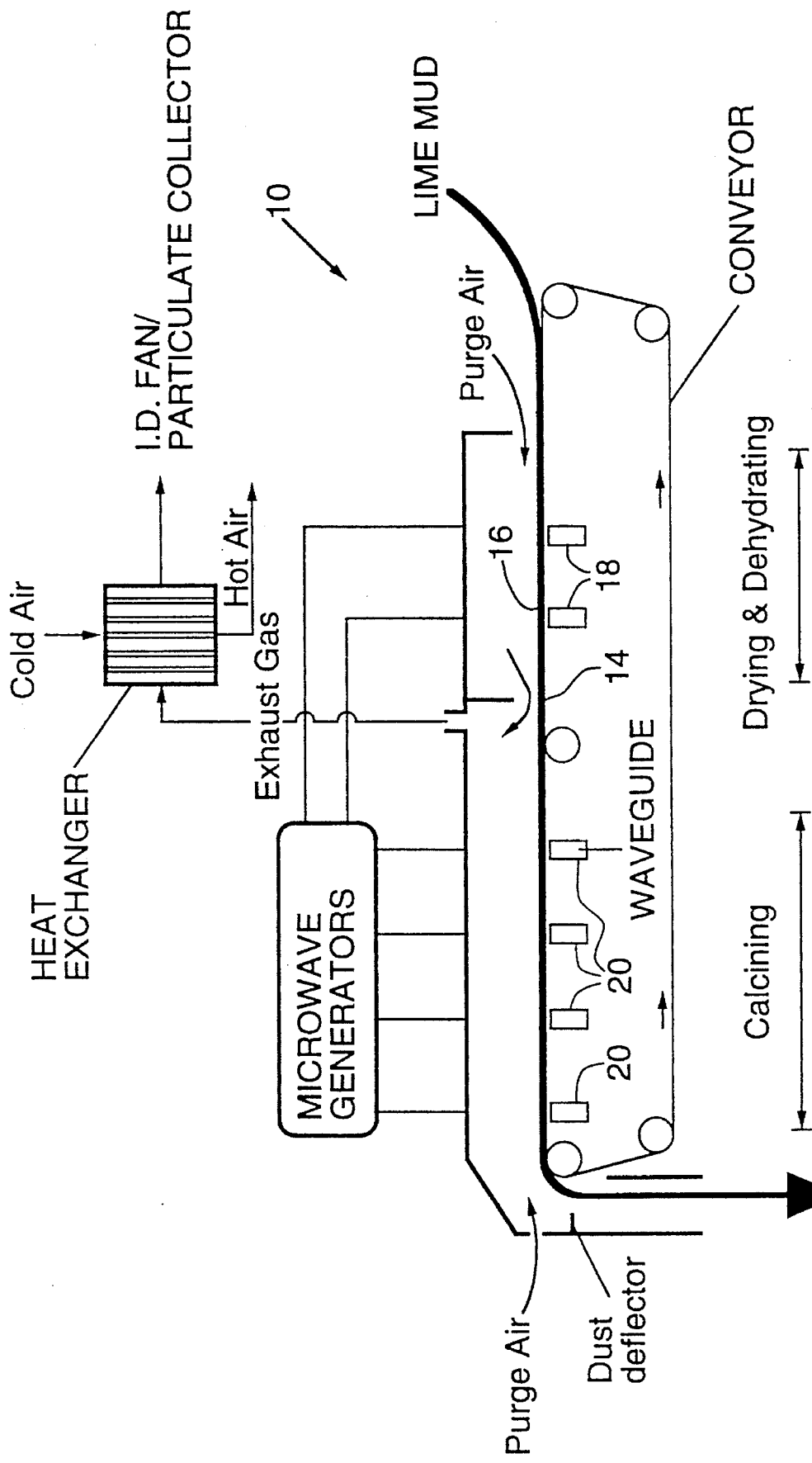
FIG. 2 contains a schematic representation of a microwave lime mud calciner constructed in accordance with a second embodiment of the invention.
Figure 3:
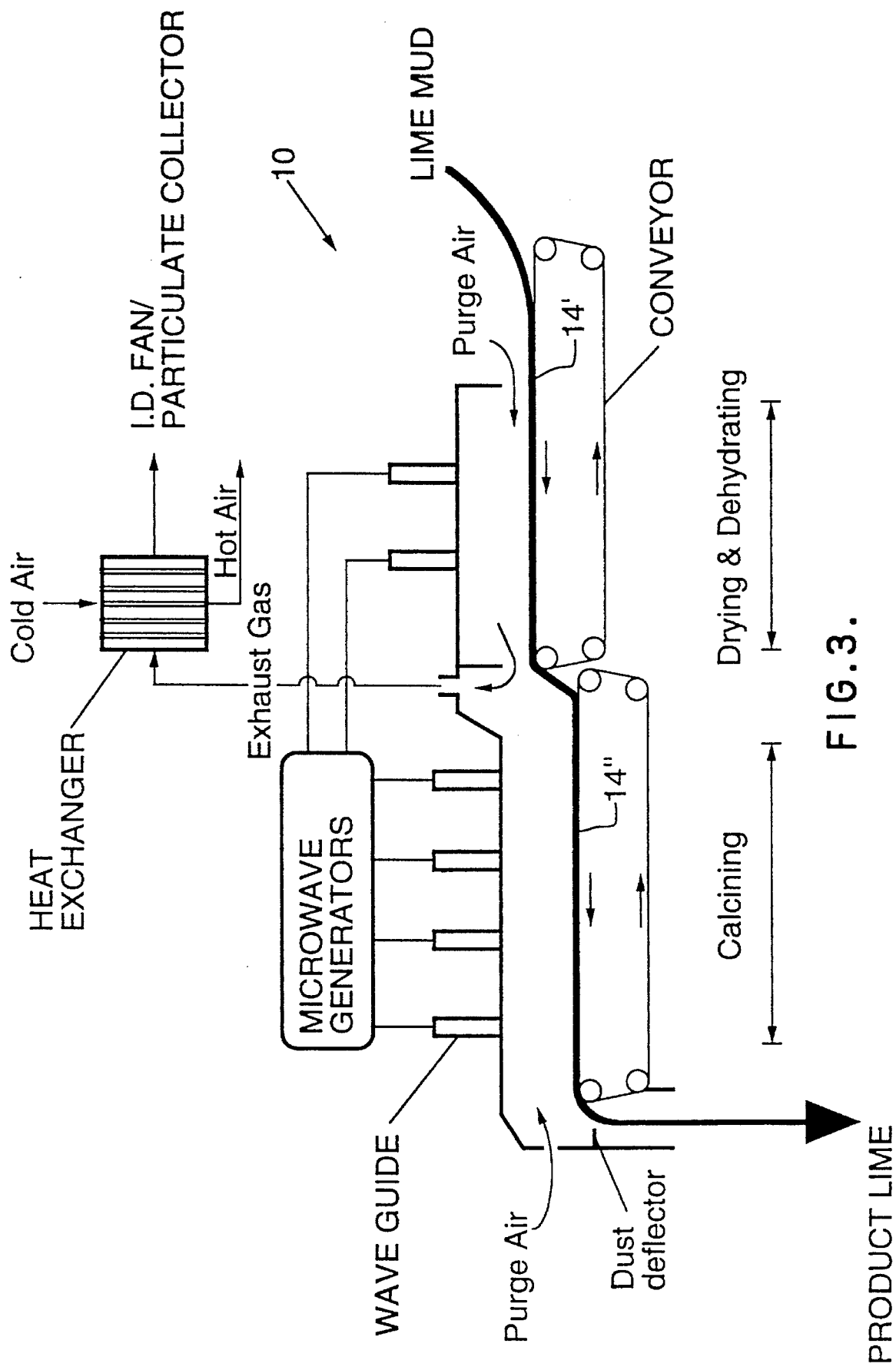
FIG. 3 contains a schematic representation of a microwave lime mud calciner constructed in accordance with a further embodiment of the invention.

In the embodiments of FIGS. 1 and 2, the conveyor 14 is illustrated as a single continuous conveyor. As seen in FIG. 3, separate conveyors 14', 14" may be used, one for the drying and dehydrating step and the other for calcining. Dependent on the length of the calciner 10, more than two conveyors may be used, as desired.

As described above, lime mud from the pulp mill recausticization operation is processed in the calciner 10 rapidly by dielectric hysteresis heating using microwave or other suitable frequency energy to effect such heating as a two-stage treatment, with lime mud being initially dried at a temperature below the decomposition temperature of calcium carbonate, generally not exceeding about 500° C., and then being heated at a temperature above the decomposition temperature of calcium carbonate, generally about 600° C., preferably about 900°, and preferably not exceeding about 1200° C., to effect decomposition. The two stages of treatment are effected in physically-separated chambers.

The novel lime mud calcining method provided herein has significant advantages over the conventional lime kilns and fuel-combustion type calciners. Since the microwave or other energy can be applied at a high level of intensity throughout the mass of treated material, a much more compact unit can be provided than the conventional lime kiln and hence the capital cost for the unit is significantly lower. Since a much lower flue gas volume is required to be handled, a much smaller fan capacity is required, leading to further decreased capital costs.

Since no combustion operation is required in the procedure provided herein to provide heating gas, the calcination operation of the invention is much easier to operate, control and maintain, with the absence of any necessity to rotate the kiln for effective heat transfer and insulating refractory materials required in conventional lime kiln operations leading to substantially lower maintenance costs.

The overall energy requirement utilizing microwave energy to effect fresh lime production from the lime mud is much less since the heat required for the drying and decomposition is generated within the body of the lime mud, in contrast to the conventional product, and there are smaller heat losses due to radiation and convection. The decreased energy level and much shorter heating time required for lime production herein ensure that product particles cannot sinter, so that the resulting lime has a high specific surface area and reactivity.

Conventional calcining procedures require washing of the mud free from sodium contaminants, mainly in the form of $Na_2CO_3$, NaOH and $Na_2S$, since these compounds cause a phenomenon known as "ringing". The procedure provided herein is able to tolerate the presence of such contaminants and their presence may help accelerate the rate of heating, due to their possible higher microwave absorption than lime mud and product lime, so that conventional lime mud washers may be eliminated. The elimination of lime mud washing provides a drier material for feed to the microwave calciner, leading to a lower energy consumption in the drying step.

The co-current flow of purge air 28 in the drying (upstream) compartment 24 and the countercurrent flow of purge air in the calcination (downstream) compartment 26 to a common outlet 30 drawn therethrough by an induction fan or other convenient means ensures that carbon dioxide released in the calcination compartment 26 cannot enter the drying compartment 24. In turn, there is avoided the formation of TRS (Total Reduced Sulfur, mainly $H_2S$) emissions associated with reaction between $CO_2$ and $H_2O$ with residual $Na_2S$ in the mud by the reaction:

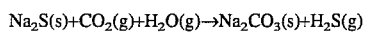

$$Na_2S(s) + CO_2(g) + H_2O(g) \rightarrow Na_2CO_3(s) + H_2S(g)$$

commonly experienced with conventional lime kilns. All moisture has been removed from the calcium carbonate by the procedure of the invention before a carbon dioxide gas atmosphere is encountered and hence the reaction depicted by the preceding reaction is avoided.

The procedure of the invention does not require the tumbling employed in conventional lime kilns and hence the dusting problems associated with such operation are avoided. An exhaust gas scrubber nevertheless may be utilized, albeit of much smaller capacity than the prior art, in conjunction with the exhaust gas stream 31 leaving outlet 30.

In addition, the arrangement of the present invention does not require high temperature refractory bricks employed in conventional lime kilns and hence the high maintenance costs associated with brick replacement are avoided.

Gaseous emissions, such as $NO_x$, $SO_2$ and $CO_2$, commonly associated with conventional combustion processes, are eliminated by the procedure employed herein.

EXAMPLE

This Example illustrates the principle of utilization of DHH to effect decomposition of calcium carbonate.

A sample of lime mud consisting mainly of $CaCO_3$ was placed in a 19 mm O.D. quartz tube and subjected in a TE01 waveguide to microwave energy supplied from a 6 KW D.C. power supply to a 2450 MHz magnetron. Decomposition of the lime mud sample to CaO and $CO_2$ was complete in less than two minutes. The product lime had a physical appearance resembling that of a sample of the lime mud calcined in a muffle furnace at 900° C. for 2 hours.

SUMMARY OF DISCLOSURE

In summary of this disclosure, the present invention provides a novel kraft pulp mill lime mud recovery and regeneration operation wherein energy for initial drying and subsequent decomposition of the lime mud is provided by dielectric hysteresis heating, and which provides significant advantages over prior art conventional lime kiln operations. Modifications are possible within the scope of this invention.

What we claim is:

1. A lime mud calciner for use in a kraft pulp mill recovery operation, comprising:

an elongate chamber having an inner wall, conveying means extending generally horizontally through said chamber from an inlet end to an outlet end, means for feeding wet lime mud to said inlet end for conveying through said elongate chamber by said conveying means to said outlet end, means for receiving lime from said outlet end of said chamber, a baffle depending from the inner wall of said chamber and dividing said elongate chamber into a first upstream radiation zone and a second downstream radiation zone, a first group of dielectric hysteresis heating elements located in said first upstream zone of said elongate chamber to impart radiation to dry lime mud conveyed on said conveying means through said first upstream zone at a radiation intensity level sufficient to dry the lime mud in said first upstream zone and form essentially moisture free dried lime mud while generating steam, a second group of dielectric hysteresis heating elements located in said second downstream zone of said chamber to impart radiation to essentially moisture free dried lime mud conveyed on said conveying means through said second downstream zone at a radiation intensity level sufficient to effect decomposition of calcium carbonate in the essentially moisture free dried lime mud to form lime and carbon dioxide, a gaseous product outlet located downstream of said baffle in the intended direction of movement of the conveying means through the elongate chamber, means for causing a first purge air stream to flow co-currently with the intended direction of movement of said conveying means through said elongate chamber through said first upstream zone to vent steam generated in said first upstream zone from said first upstream zone and through said gaseous product outlet, and means for causing a second purge air stream to flow counter-currently to the intended direction of movement of said conveying means through said elongate chamber through said second downstream zone to vent carbon dioxide generated in said second downstream zone from said second downstream zone and through said gaseous product outlet.

2. The lime mud calciner of claim 1 wherein said means for causing a first purge air stream to flow co-currently through said first upstream zone and said means for causing a second purge air stream to flow counter-currently through said second downstream zone comprises an exhaust fan operatively connected to said gaseous product outlet.

3. The lime mud calciner of claim 1 wherein said conveying means comprises a single endless conveyor extending within the elongate chamber.

4. The lime mud calciner of claim 1 wherein said conveying means comprises multiple endless conveyors arranged within the elongate chamber.

5. The lime mud calciner of claim 1 wherein said dielectric heating elements are located above said conveyor means, said conveyor means comprises dielectric radiation-reflective material and internal walls of said elongate chamber comprise dielectric radiation-reflective material.

6. The lime mud calciner of claim 1 wherein said dielectric heating elements are located below said conveyor means, said conveyor means comprises dielectric radiation transparent material and internal walls of said elongate chamber comprise dielectric radiation-reflective material.

\* \* \* \* \*